(12) United States Patent
Zhang

(10) Patent No.: US 11,353,742 B2
(45) Date of Patent: Jun. 7, 2022

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventor: Peng Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/041,043

(22) PCT Filed: Jul. 29, 2020

(86) PCT No.: PCT/CN2020/105419
§ 371 (c)(1),
(2) Date: Sep. 24, 2020

(87) PCT Pub. No.: WO2022/007053
PCT Pub. Date: Jan. 13, 2022

(65) Prior Publication Data
US 2022/0011632 A1    Jan. 13, 2022

(30) Foreign Application Priority Data
Jul. 10, 2020  (CN) .......................... 202010660941.3

(51) Int. Cl.
G02F 1/1335    (2006.01)
G02F 1/13357   (2006.01)

(52) U.S. Cl.
CPC .. *G02F 1/133604* (2013.01); *G02F 1/133603* (2013.01); *G02F 1/133609* (2013.01);
(Continued)

(58) Field of Classification Search
CPC ......... G02F 1/133604; G02F 1/133602; G02F 1/133603
See application file for complete search history.

(56) References Cited

U.S. PATENT DOCUMENTS

2015/0221835 A1* 8/2015 Tischler ................ H01L 33/502
                                                       438/27
2017/0153486 A1* 6/2017 Ahn ..................... G02B 6/0088
(Continued)

FOREIGN PATENT DOCUMENTS

CN   111176018 A    5/2020
CN   210894768 U    6/2020
WO   2013021987 A1  2/2013

*Primary Examiner* — Kevin M Nguyen
(74) *Attorney, Agent, or Firm* — Mark M. Friedman

(57) ABSTRACT

The present invention provides a backlight module and a display device, wherein the backlight module includes an in-plane hole, and further includes a first light source and a second light source each independently driven and controlled; the light guide is disposed at a wall of the in-plane hole corresponding to the first light source, and is configured to provide light emitted by the first light source to an area of the in-plane hole under a predetermined condition. Compared with the prior art, the embodiments of the present invention solve the problem in the prior art that in-plane holes in a backlight module of a liquid crystal display device have no light source to provide brightness, thereby realizing the in-plane hole of the backlight module with brightness under a predetermined condition, and providing more scene applications of the area of the in-plane hole.

11 Claims, 2 Drawing Sheets

(52) U.S. Cl.
CPC .. *G02F 1/133611* (2013.01); *G02F 1/133613* (2021.01); *G02F 2201/52* (2013.01)

(56) References Cited

U.S. PATENT DOCUMENTS

| | | | |
|---|---|---|---|
| 2019/0250462 A1* | 8/2019 | Lin | G02F 1/133603 |
| 2019/0280050 A1* | 9/2019 | Chaji | G02F 1/017 |
| 2019/0385513 A1* | 12/2019 | Iguchi | G09F 9/00 |
| 2021/0072594 A1 | 3/2021 | Zhang et al. | |

\* cited by examiner providing a hole on the side where a backlight module is set;  — S301 disposing a light guide at a wall of the in-plane hole; wherein the light guide is configured to provide light emitted by a light source device to an area of the in-plane hole under a predetermined condition.  — S302

BACKLIGHT MODULE AND DISPLAY DEVICE

BACKGROUND OF INVENTION

Field of Invention

The present invention relates to the technical field of liquid crystal display, in particular to a backlight module and a display device.

Description of Prior Art

With advent of an information age, displays have become a standard medium for human-machine communication. Humans obtain information from the outside world, and more than 80% of that comes from vision. Therefore, display devices with rich colors, moderate brightness, energy saving, and environmental protection play a very important role in human production, life, and various human-computer interaction occasions. In recent years, display technologies such as liquid crystal display (LCD), digital light processing (DLP) rear projection, and plasma display have been gradually improved.

Liquid crystal is a substance between solid and liquid. It is an organic compound with regular molecular arrangement. If it is heated, it will appear in a transparent liquid state, and if it is cooled, it will appear in a turbid solid state of crystalline particles. The liquid crystal molecules used in liquid crystal displays are arranged in a structure similar to fine matchsticks, and are called nematic liquid crystal, and liquid crystal displays made of this type of liquid crystals are also called liquid crystal display (LCD) systems, which are mainly composed of liquid crystal cells and backlight components. The liquid crystal display emits light through a high-brightness light source, which is directed to a light guide plate and undergoes multiple reflections inside the light guide plate to complete conversion between a point light source or a line light source to an area light source, and then the light is uniformly and parallelly projected to a polarizing film, and then passes through the liquid crystal molecules followed by passing through an upper polarizing film and finally imaging.

Liquid crystal display devices have been widely used in today's display devices due to their advantages of low energy consumption and low radiation. With continuous advancement of liquid crystal display technology, large-sized and thin liquid crystal display devices have been increasingly becoming the mainstream demand of the market. Therefore, narrow-border and borderless liquid crystal displays have also become a development trend. Especially with development of full-screen technology, mobile terminal applications that use a backlight module of the display device as an in-plane hole structure for placement of a camera placement have been launched to the market. In such applications, a basic structure of the liquid crystal display device includes a panel, a backlight module, etc., wherein the panel includes an upper polarizing layer 101, a CF glass substrate 102, a TFT glass substrate 103, a lower polarizing layer 104, etc., and the backlight module includes a brightness enhancement film 105, diffusion sheet 106, light guide 107, backplane 108, etc., as shown in FIG. 1.

As shown in FIG. 1, a current backlight module with an in-plane hole structure does not have a light source to provide brightness in an area inside the opening 109, and the opening only serves as a channel for receiving and transmitting ambient light from the camera below the opening.

SUMMARY OF INVENTION

In view of above, embodiments of the present invention provide a backlight module and a display device to solve the problem in the prior art that in-plane holes in a backlight module of a liquid crystal display device have no light source to provide brightness.

Accordingly, embodiments of the present invention provide the following technical solutions:

In a first aspect of the present invention, a backlight module is provided, wherein the backlight module includes an in-plane hole, and further including: a light source device and a light guide, wherein the light source device includes a first light source and a second light source each independently driven and controlled; the light guide is disposed at a wall of the in-plane hole corresponding to the first light source, and is configured to provide light emitted by the first light source to an area of the in-plane hole under a predetermined condition.

Optionally, the backlight module further includes: a functional layer disposed on the light source device and provided with a first opening corresponding to the in-plane hole, wherein the light source device is provided with a second opening corresponding to the in-plane hole and having a diameter smaller than a diameter of the first opening.

Optionally, an end of the light guide is inserted into the first opening, an opposite end of the light guide is inserted into the second opening, and a diameter of the end of the light guide is larger than a diameter of the opposite end.

Optionally, the first light source is disposed in an overlapping area of the light source device and the first opening, and the second light source is disposed in an overlapping area of the light source device and the functional layer.

Optionally, a light incident surface of the light guide is disposed corresponding to a light-exiting surface of the first light source, the light guide is provided with a through hole, and a light-exiting surface of the light guide is disposed on an inner wall of the through hole.

Optionally, an included angle between the light-exiting surface of the light guide and the light incident surface of the light guide is an acute angle.

Optionally, a light blocking film is disposed between a side surface of the light guide and the light source device.

Optionally, the light blocking film is a sealant, and a side surface of the light guide in the second opening is fixed and connected to the light source device by the sealant.

Optionally, the light source device includes: a backplane, a circuit substrate disposed on the backplane, and mini-LED units disposed on the circuit substrate, and wherein the mini-LED units in the first light source and in the second light source are independently driven and controlled.

Optionally, the light source device includes RGB three-color package lamps or RGB three-color chips fixed by a transparent glue; each of the RGB three-color package lamps provides white light, red light, green light, or blue light to the area of the in-plane hole through the light guide; each of the RGB three-color chips respectively provides red light, green light, or blue light to the area of the in-plane hole through the light guide; and the backlight module further includes a blue chip disposed in an area outside the light guide and a quantum dot light-emitting film disposed above the light source device.

Optionally, the backlight module includes a vertically disposed metal backplane, and the light guide is fixed to the vertically disposed metal backplane.

In a second aspect of the present invention, a display device is provided, including any one of the above-mentioned backlight modules.

The technical solution of the embodiments of the present invention has the following advantages:

Embodiments of the present invention provide a backlight module and a display device, wherein the backlight module includes an in-plane hole, and further includes: a light source device and a light guide, wherein the light source device includes a first light source and a second light source each independently driven and controlled; the light guide is disposed at a wall of the in-plane hole corresponding to the first light source, and is configured to provide light emitted by the first light source to an area of the in-plane hole under a predetermined condition. By the above-mentioned light guide provided at the wall of the in-plane hole in the backlight module, under the predetermined condition, the light emitted by the first light source is provided to the area of the in-plane hole. Compared with the prior art where the in-plane hole is only used as a channel for receiving and transmitting ambient light from the camera below the opening, without light source to provide brightness, an embodiment of the present invention provides a device that is applied to an in-plane hole of a back light unit (BLU) structure and provides light control for the area of the in-plane hole. The hole in the prior art only play a role of a channel for transmitting and receiving ambient light of the camera below the hole. The embodiment of the present invention can provide light for the area of the in-plane hole, which solves the problem in the prior art that in-plane holes in a backlight module of a liquid crystal display device have no light source to provide brightness, thereby realizing the in-plane hole of the backlight module with brightness under a predetermined condition, and providing more scene applications of the area of the in-plane hole.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

The components in the drawings are not drawn to scale, but only to illustrate the principle of the present invention. In order to facilitate the illustration and description of some parts of the present invention, corresponding parts in the drawings may be enlarged, that is, to make them larger relative to other parts in the exemplary device actually manufactured according to the present invention. In the drawings, the same or similar technical features or components will be represented by the same or similar reference numerals.

DETAILED DESCRIPTION OF PREFERRED EMBODIMENTS

Figure 1:
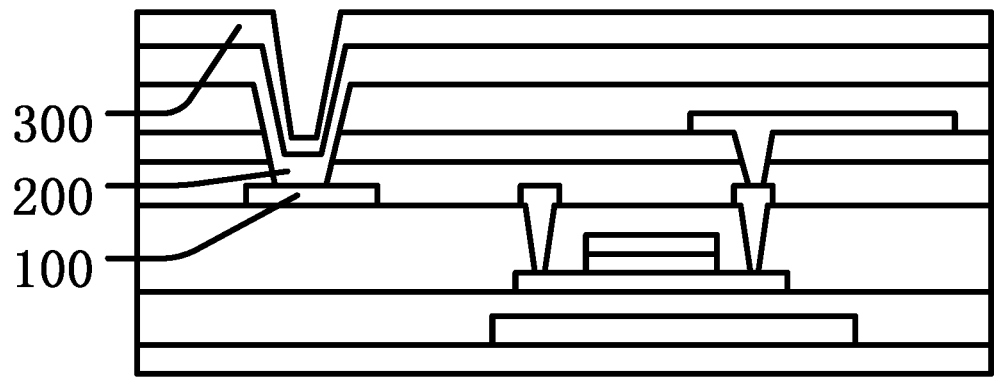
FIG. 1 shows a schematic diagram of a backlight module and a display device including in-plane holes in the prior art.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

In the present application, the term "exemplary" is used to mean "serving as an example, illustration, or description." Any embodiment described as "exemplary" in the present application is not necessarily to be construed as preferred or advantageous over other embodiments. In order to enable any person skilled in the art to implement and use the present invention, the following description is given. In the following description, details are set forth for the purpose of explanation. It should be understood by one of ordinary skill in the art that the present invention may be implemented without the use of these specific details. In other embodiments, well-known structures and procedures are not described in detail to avoid obscuring the description of the present invention with unnecessary details. Accordingly, the present invention is not intended to be limited to the embodiments shown, but is to be accorded the widest scope consistent with the principles and features disclosed herein.

A thickness of a layer and a shape of an area in the drawings do not reflect a true ratio, whose purpose is only to illustrate the content of the present invention.

As described above, the current backlight module with an in-plane hole structure does not have a light source to provide brightness in an area inside the opening, and the opening only serves as a channel for receiving and transmitting ambient light from the camera below the opening. In order to solve the problem of display of the in-plane hole, the present invention provides a backlight module and a display device. Hereinafter, each embodiment of the present invention will be described one by one, so that those skilled in the art can fully understand the principle of the present invention.

According to an embodiment of the present invention, a backlight module is provided, which is mainly objected to a full-screen and borderless display panel. Of course, it can also be applied to a normal display panel with a border or a narrow border. As long as it is a display panel structure that requires openings to be provided on the display panel, the structure in the present invention can be adopted. The specific structure of the display panel will be described in detail below.

In addition, the technical features involved in the different embodiments of the present invention described below can be combined with each other as long as they do not conflict with each other.

Figure 2:
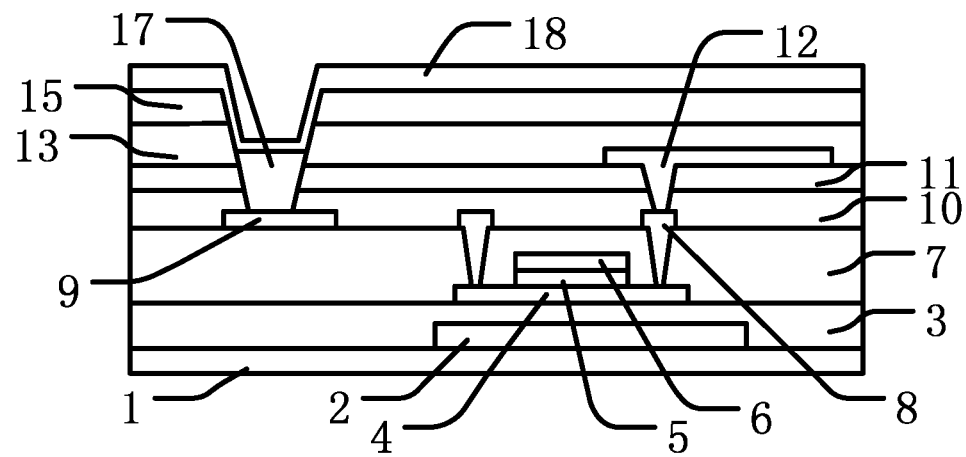
FIG. 2 is a schematic structural diagram of a backlight module according to an embodiment of the present invention.

FIG. 2 is a schematic structural diagram of a backlight module according to an embodiment of the present invention. As shown in FIG. 2, the backlight module includes an in-plane hole. The backlight module further includes: a light source device 201 and a light guide 202. The light source device 201 includes a first light source and a second light source each independently driven and controlled. The light guide 202 is disposed at a wall of the in-plane hole corresponding to the first light source, and is configured to provide light emitted by the first light source to an area of the in-plane hole under a predetermined condition.

By the above-mentioned light guide 202 provided at the wall of the in-plane hole in the backlight module, under the predetermined condition, the light emitted by the first light source is provided to the area of the in-plane hole. Compared with the prior art where the in-plane hole is only used as a channel for receiving and transmitting ambient light from the camera below the opening, without light source to provide brightness, an embodiment of the present invention provides a device that is applied to an in-plane hole of a BLU structure and provides light control for the area of the in-plane hole. The hole in the prior art only plays a role of a channel for transmitting and receiving ambient light of the camera below the hole. The embodiment of the present invention can provide light for the area of the in-plane hole, which solves the problem in the prior art that in-plane holes in a backlight module of a liquid crystal display device have no light source to provide brightness, thereby realizing the in-plane hole of the backlight module with brightness under a predetermined condition, and providing more scene applications of the area of the in-plane hole. The light source and light guide device are introduced to the BLU hole, combined with the panel to enhance the application scenarios and user experience of terminal products, thereby enhancing competitiveness.

The backlight device can be combined with a cell of a blind hole to achieve display in the hole. The cell of the blind hole is the area under the screen corresponding to an area for hardware installation. The hardware structure includes one or more of the following structures: a camera device, a start key, an earpiece, or a speaker. A specific installation method of the hardware structure is not particularly limited herein, and in an actual process of manufacturing a display panel, where the hardware structure needs to be set, and the size and shape of the mounting hole to be cut, are determined according to what product the display panel needs to make. When cutting a mounting hole, a shape of the mounting hole to be cut is determined according to the hardware structure to be installed. For different hardware structures, mounting holes of different shapes can be set. Optionally, a cross-sectional shape of the mounting hole in a direction parallel to a substrate is selected from one or more of the shapes of a circle, an oval, a rectangle, a trapezoid, a diamond, or a square. Normally, the blind hole is a hole that connects a surface layer to an inner layer without penetrating the entire board. The blind holes are located on top and bottom surfaces of a printed circuit board, have a certain depth not exceeding a certain ratio (aperture), and are configured to connect a surface line to an underlying inner line. The depth is not particularly limited, and it depends on the actual situation. In the existing in-plane blind hole design of the display device, a mobile phone camera is installed under the blind hole which penetrates through a glass of the array substrate and all layers except a buffer layer on the glass, and the blind hole also penetrates a color filter layer and a black matrix of a color filter substrate.

In the following embodiments, a camera device as which the above-mentioned hardware structure serves is taken as an example for detail illustration.

As shown in FIG. 2, the backlight module further includes a functional layer 203 arranged on the light source device. A multilayered film 203 may include a quantum dot (QD) light-emitting film, one or more layers of diffusion film (DIF), a lower brightness enhancement film (BEF), and an upper brightness enhancement film arranged sequentially from bottom to top. A functional layer is provided with a first opening corresponding to the in-plane hole. The light source device is provided with a second opening corresponding to the in-plane hole. A diameter of the second opening is smaller than that of the first opening, so that light passing through the first opening can be refracted to the second opening, thereby improving a light environment at the second opening. Correspondingly, an end of the light guide is inserted into the first opening, an opposite end of the light guide is inserted into the second opening, and a diameter of the end of the light guide is larger than a diameter of the opposite end.

In an alternative embodiment, the first light source is arranged in an overlapping area of the light source device and the first opening to provide light to the first opening. In another alternative embodiment, the second light source is arranged in an overlapping area of the light source device and the functional layer to supply sufficient brightness and uniformly distributed light source, so that the display can display images normally.

In an alternative embodiment, a light incident surface of the light guide is disposed corresponding to a light-exiting surface of the first light source, the light guide is provided with a through hole, and a light-exiting surface of the light guide is disposed on an inner wall of the through hole. Further, an included angle between the light-exiting surface of the light guide and the light incident surface of the light guide is an acute angle. As such, more light is refracted to the area of the in-plane hole, and a light environment of the in-plane hole is further improved.

The light source device 201 of the backlight module further includes a chip 204. The backlight module further includes a flexible printed circuit board 205 (FPC) and a backplane 206 disposed under the flexible printed circuit board 205.

The above-mentioned preset conditions for providing the light emitted by the light source device 201 to the area of the in-plane hole may include many kinds, and in the case of a camera device provided below the above-mentioned in-plane hole, the above-mentioned preset condition may be that the camera device below the in-plane hole is in an off state. Specifically, in a device that is applied to the in-plane hole of a BLU structure and provides light control for the area of the in-plane hole, when the camera device is turned on, the chip near the hole is turned off (as long as a range of the turned-off area does not impact the camera device's imaging), and only serves as a channel of the camera device for transmitting and receiving ambient light. When the camera device is not turned on, the chip under the light guide ring can emit light with the panel to support the display application in the hole.

The above-mentioned light guide is configured to be installed in the in-plane hole, so a height h and a width w of its longitudinal cross section should be adapted to a size of the in-plane hole. The light guide has a relative relationship with the backlight module when it is installed in the in-plane hole as shown in FIG. 2. Regarding the in-plane hole in FIG. 2, the light guide can be designed to be smaller, as long as it can be installed in the in-plane hole and can refract the light from the backlight module into the in-plane hole.

A shape of the above-mentioned light guide is not particularly limited, as long as it can allow the light guide to refract the light from a corresponding position of the backlight module into the in-plane hole, and it can be any shape that those skilled in the art can think of. For example, the shape of the light guide is a hollow cylinder and is divided into an upper portion and a lower portion, wherein a transverse cross section of the upper portion and a transverse cross section of the lower portion are both annular, and the transverse cross section of the upper portion and the transverse cross section of the lower portion have different diameters. It should be understood that the shape of the light guide is not particularly limited in the present invention. The transverse cross section of the upper portion and the transverse cross section of the lower portion the light guide can also be approximately circular, or have shapes other than circular, such as elliptical, polygonal, etc., to form cylinders of various shapes. The transverse cross section of the upper portion and the transverse cross section of the lower portion can also have non-closed geometric shapes, such as arcs or other forms of curves or even straight lines, such that the light guide thus formed has a shape of a partial cylinder, that is, the light guide is not a complete cylinder.

The inside of the light guide can also be solid or partially hollow. For example, the light guide is not made to form a penetrating structure, but at the upper portion of the light guide, a connecting member is provided on an inner surface of the light guide, and the connecting member is configured to connect any two points on the inner surface in a cross-sectional direction. Specifically, the connecting member is arranged along the annular inner surface, and has an annular cross section which is an exemplary case. The connecting member can also be, for example, a rod connecting opposite ends of a diameter of the inner surface, a polygon connecting arbitrary points on the inner surface, or the like. Those skilled in the art can make arbitrary settings according to the requirements of light refraction and the requirements of the structure of the light guide.

A thickness of each part of the light guide can be different, and those skilled in the art can take specific values for the thickness according to actual conditions, such as the size of the backlight module. For example, when the in-plane hole has a diameter of 6.7 mm, the vertical lower portion of the light guide shown in FIG. 2 may have a thickness of 1 mm, and the upper portion of the light guide may have a thickness gradually changed from 1-2 mm.

The shape of the longitudinal cross section of the light guide can be diversified. FIG. 2 shows a possible shape, in which the lower portion of the light guide is cylindrical or approximately cylindrical, and the longitudinal cross-section of the upper portion has a polygonal shape, which is adapted to the in-plane hole shown in FIG. 2. Those skilled in the art should understand that according to the different structural shapes of the in-plane holes shown in FIG. 2 and other in-plane holes, the light guides of different shapes can be designed.

In another alternative embodiment, a light guide of another shape adopted for the same in-plane hole structure is provided. For example, a light-exiting surface and a light incident surface of the upper portion of the light guide are both flat surfaces, but they can also be made into curved surfaces according to actual conditions. The shape of the light guide can refract the light from the backlight module toward a central area of the hole. Those skilled in the art can also design light guides of other shapes, such as a round table or a polyhedron according to required lighting settings.

In an alternative embodiment, the light guide may be made of a transparent material. Specifically, the transparent material may be polycarbonate (PC). PC is an almost colorless glassy amorphous polymer, which has good optical properties. PC resin of high molecular weight has high toughness, having a notched Izod impact strength ranging from 600 J/m to 900 J/m and a heat distortion temperature of about 130° C., which may be increased by 10° C. when reinforced by a glass fiber. A flexural modulus of PC can reach more than 2400 MPa, and the resin can be processed into large rigid products. The transparent material may also be polymethyl methacrylate (PMMA). PMMA has the advantages of high transparency, low price, easy machining, etc., and is a frequently used substitute material for glass.

In order to ensure that the light emitted by the light source device is uniformly provided to the area of the in-plane hole, in an alternative embodiment, the light-exiting surface of the light guide has a microstructure, which can improve the uniformity of light provided to the area of the in-plane hole. In an alternative embodiment, the light guide may also have a certain degree of haze, and a surface of the light-exiting surface C may be a microstructure, so that the light is distributed as uniform in as possible in the area of the in-plane hole.

In an alternative embodiment, a light blocking film is provided on an outer surface of the light guide. Specifically, the outer surface of the transparent light guide at the hole of the backlight device (super-directional optical film & light guide place (LGP)) needs to be processed with a light blocking film to prevent light inside the back light unit (BLU) from leaking out of the central area of the hole and avoid impacting the imaging quality of a camera device. Specifically, the light blocking film is a sealant, and a side surface of the light guide in the second opening is fixed and connected to the light source device by the sealant.

The above-mentioned light source device can have various implementation modes. In an alternative embodiment, the transparent light guide at the hole can be made into various irregular shapes. For example, the backlight device uses mini-LEDs or micro-LEDs as the light source, and the chip close to a bottom of the hole alone provides light for the light guide. In a specific alternative embodiment, the light source device includes a backplane, a circuit substrate provided on the backplane, and mini-LED units provided on the circuit substrate, wherein the mini-LED units in the first light source and in the second light source are independently driven and controlled. In another specific alternative embodiment, the light source device may use RGB three-color package lamps, and each of the RGB three-color package lamps provides white light, red light, green light, or blue light to the area of the in-plane hole through the light guide. In another specific alternative embodiment, the light source device may also be RGB three-color chips fixed by a transparent glue, and each of the RGB three-color chips respectively provides red light, green light, or blue light to the area of the in-plane hole through the light guide, wherein the glue is used to protect the chip after curing, and can be preferably made of a material having a refractive index close to a refractive index of a material of the light guide, such as PC, such that it may be UV glue for example. The refractive index of the UV glue is close to or slightly less than that of PC, so that more light enters the light guide ring, reducing total light reflection. When white light is required to provide to the area of the in-plane hole, and the light source device is in the above two modes, the backlight module further includes a blue chip disposed in an area outside the light guide and a quantum dot light-emitting film disposed above the light source device. A specific position of the quantum dot light-emitting film is the bottom layer of the multilayered film 203, and the area outside the light guide ring of the hole of a light board uses the blue chips with the quantum dot light-emitting film to facilitate the backlight to display white light in the area outside the light guide ring. Those skilled in the art can also conceive other light source implementation modes based on the principles of the embodiments of the present invention, which is not particularly limited in the present invention.

As shown in FIG. 2, the above-mentioned backlight module includes a vertically disposed metal backplane 207, and the light guide 202 is fixed to the vertically disposed metal backplane 207 by a sealant 208. Material of the sealant 208 can be UV glue or silica gel, etc. The UV glue is also called a photosensitive glue or an ultraviolet curing glue, which can only be cured by ultraviolet light. The UV glue is a type of adhesive, which can be used as an adhesive or as a glue for paints, coatings, inks, etc. UV is the abbreviation of ultraviolet, that is, ultraviolet rays. Ultraviolet (UV) is invisible to a naked eye, and is an electromagnetic radiation of a wavelength ranging from 10 nm to 400 nm, different from a wavelength of visible light. Curing principle of the UV glue is that a photoinitiator (or photosensitizer) in the UV curing material absorbs ultraviolet light and generates active free radicals or cations, which initiates polymerization of monomers and crosslinking chemical reactions, so that the adhesive changes from liquid to solid within a few seconds.

Figures 3, 4:
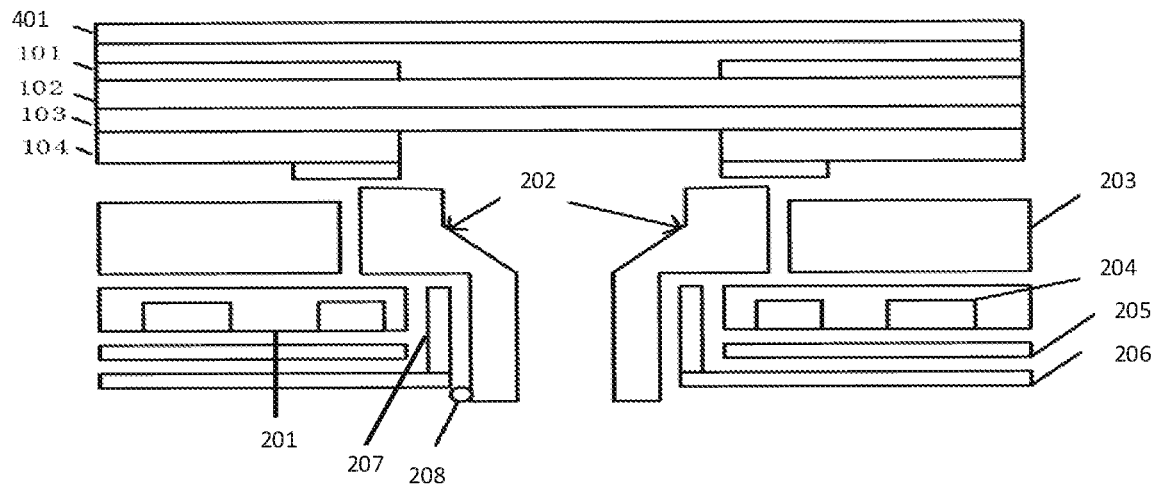
FIG. 3 is a flowchart of a method of manufacturing a backlight module according to a preferred embodiment of the present invention.
FIG. 4 is a schematic diagram of a display module according to an embodiment of the present invention.

Another embodiment of the present invention also provides a method of manufacturing a backlight module, as shown in FIG. 3, including the following steps:

S301: providing a hole on the side where a backlight module is set;

S302: disposing a light guide at a wall of the in-plane hole; wherein the light guide is configured to provide light emitted by a light source device to an area of the in-plane hole under a predetermined condition.

By the above-mentioned method of manufacturing the backlight module, which sets the light guide at the wall of the in-plane hole in the backlight module, under the predetermined condition, the light emitted by the light source device is provided to the area of the in-plane hole. Compared with the prior art where the in-plane hole is only used as a channel for receiving and transmitting ambient light from the camera below the opening, without light source to provide brightness, an embodiment of the present invention provides a device that is applied to an in-plane hole of a BLU structure and provides light control for the area of the in-plane hole. The hole in the prior art only play a role of a channel for transmitting and receiving ambient light of the camera below the hole. The embodiment of the present invention can provide light for the area of the in-plane hole, which solves the problem in the prior art that in-plane holes in a backlight module of a liquid crystal display device have no light source to provide brightness, thereby realizing the in-plane hole of the backlight module with brightness under a predetermined condition, and providing more scene applications of the area of the in-plane hole. The light source and light guide device are introduced to the BLU hole, combined with the panel to enhance the application scenarios and user experience of terminal products, thereby enhancing competitiveness.

Optionally, the above-mentioned preset condition may include that the camera device below the in-plane hole is in an off state.

The embodiment of the present invention also provides a display device, including the backlight module of any of the above embodiments. FIG. 4 is a schematic diagram of the display module according to the embodiment of the present invention. As shown in FIG. 4, the lower portion is the backlight module, and the display device further includes a lower polarizing layer 104, a thin film transistor (TFT) glass substrate 103, a color filter (CF) glass substrate 102, an upper polarizing layer 101, and a cover glass (CG) 401 which are sequentially arranged on the backlight module from bottom to top.

In specific implementation, the present invention is mainly applicable to full-screen and borderless display panels. For organic light-emitting semiconductor (PLED) display panels, it generally includes at least a substrate, a thin film transistor structure, an anode layer, a light-emitting layer, a cathode layer, and an encapsulation layer sequentially arranged on the substrate. In addition, it also includes some other layers, such as a planarization layer, a passivation layer, etc., which are not particularly limited herein. The thin film transistor layer is laminated on a side surface of the substrate for controlling light emission of a pixel area. Specifically, the thin film transistor layer includes a plurality of thin film transistors. Each of the thin film transistors includes a gate formed on the substrate, a gate insulating layer covering the gate, an active layer formed on the gate insulating layer, and a source and a drain formed on the active layer. It can be understood that the above-mentioned thin film transistors are described by taking a bottom gate type as an example, and the present invention is not particularly limited herein. In some other embodiments, the thin film transistor may be a top gate type.

As described above, according to the technical solution of this embodiment, by adding a light source and a light guide at the hole of the backlight module compared with a display panel, a display device is provided, wherein when the camera device is turned on, the chip near the hole is turned off (as long as a range of the turned-off area does not impact the camera device's imaging), and only serves as a channel of the camera device for transmitting and receiving ambient light. When the camera device is not turned on, the chip under the light guide ring can emit light with the panel to support the display application in the hole. According to the technical solution of such embodiments, the application scenarios and user experience of terminal products can be improved, thereby improving product competitiveness.

Further, an embodiment of the present invention also provides an electronic device, which includes the display device according to the above embodiments. The electronic device can be one of a mobile phone, a tablet, a notebook computer, a vehicle-mounted display device, an industrial control display device, and a consumer display device.

Although the embodiments of the present invention have been described with reference to the accompanying drawings, those skilled in the art can make various modifications and variations without departing from the spirit and scope of the present invention, and such modifications and variations fall within the scope defined by the appended claims.

What is claimed is:

1. A backlight module, comprising an in-plane opening, and further comprising: a light source device, a light guide, and a functional layer disposed on the light source device and provided with a first opening corresponding to the in-plane opening, wherein the light source device comprises a first light source and a second light source each independently driven and controlled;

the light guide is disposed at a wall of the in-plane opening corresponding to the first light source, and is configured to provide light emitted by the first light source to an area of the in-plane opening under a predetermined condition; and the light source device is provided with a second opening corresponding to the in-plane opening and having a diameter smaller than a diameter of the first opening.

2. The backlight module according to claim 1, wherein an end of the light guide is inserted into the first opening, an opposite end of the light guide is inserted into the second opening, and a diameter of the end of the light guide is larger than a diameter of the opposite end.

3. The backlight module according to claim 2, wherein the first light source is disposed in an overlapping area of the light source device and the first opening, and the second light source is disposed in an overlapping area of the light source device and the functional layer.

4. The backlight module according to claim 2, wherein a light incident surface of the light guide is disposed corresponding to a light-exiting surface of the first light source, the light guide is provided with a through hole, and a light-exiting surface of the light guide is disposed on an inner wall of the through hole.

5. The backlight module according to claim 4, wherein an included angle between the light-exiting surface of the light guide and the light incident surface of the light guide is an acute angle.

6. The backlight module according to claim 2, wherein a light blocking film is disposed between a side surface of the light guide and the light source device.

7. The backlight module according to claim 4, wherein the light blocking film is a sealant, and a side surface of the light guide in the second opening is fixed and connected to the light source device by the sealant.

8. The backlight module according to claim 1, wherein the light source device comprises: a backplane, a circuit substrate disposed on the backplane, and mini-LED units disposed on the circuit substrate, and wherein the mini-LED units in the first light source and in the second light source are independently driven and controlled.

9. The backlight module according to claim 1, wherein the light source device comprises RGB three-color package lamps or RGB three-color chips fixed by a transparent glue;

each of the RGB three-color package lamps is configured to provide white light, red light, green light, or blue light to the area of the in-plane opening through the light guide;

each of the RGB three-color chips is configured to provide red light, green light, or blue light to the area of the in-plane opening through the light guide; and the backlight module further comprises a blue chip disposed in an area outside the light guide and a quantum dot light-emitting film disposed above the light source device.

10. The backlight module according to claim 1, wherein the backlight module comprises a vertically disposed metal backplane, and the light guide is fixed to the vertically disposed metal backplane.

11. A display device, comprising the backlight module according to claim 1.

* * * * *